(12) United States Patent
Komura et al.

(10) Patent No.: US 10,730,561 B2
(45) Date of Patent: Aug. 4, 2020

(54) MOUNTING STRUCTURE FOR CURTAIN AIRBAG DEVICE

(71) Applicant: TOYOTA JIDOSHA KABUSHIKI KAISHA, Toyota-shi, Aichi-ken (JP)

(72) Inventors: Takamichi Komura, Okazaki (JP); Osamu Fukawatase, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 16/199,414

(22) Filed: Nov. 26, 2018

(65) Prior Publication Data

US 2019/0176895 A1    Jun. 13, 2019

(30) Foreign Application Priority Data

Dec. 12, 2017  (JP) ................. 2017-238074

(51) Int. Cl.
| | | |
|---|---|---|
| *B62D 25/04* | (2006.01) | |
| *B60R 21/213* | (2011.01) | |
| *B60R 13/02* | (2006.01) | |
| *B60R 21/16* | (2006.01) | |

(52) U.S. Cl.
CPC ............ *B62D 25/04* (2013.01); *B60R 13/025* (2013.01); *B60R 13/0206* (2013.01); *B60R 21/213* (2013.01); *B60R 2021/161* (2013.01)

(58) Field of Classification Search
CPC ... B62D 25/04; B60R 13/0206; B60R 13/025; B60R 21/213; B60R 2021/161
See application file for complete search history.

(56) References Cited

U.S. PATENT DOCUMENTS

| | | | |
|---|---|---|---|
| 6,152,485 A | 11/2000 | Kato | |
| 7,766,370 B2 * | 8/2010 | Putcha | .............. B60R 21/215 |
| | | | 280/728.3 |

(Continued)

FOREIGN PATENT DOCUMENTS

| | | |
|---|---|---|
| DE | 102006053990 A1 | 5/2007 |
| GB | 2479448 A | 10/2011 |

(Continued)

OTHER PUBLICATIONS

U.S. Appl. No. 16/014,424, filed Jun. 21, 2018 in the name of Takamichi Komura.

*Primary Examiner* — Lori L Lyjak
(74) *Attorney, Agent, or Firm* — Harris A. Pitlick

(57) ABSTRACT

A mounting structure for a curtain airbag device includes: a first pillar extending along a vehicle upper-lower direction; a second pillar disposed on a vehicle rear side at a predetermined interval with respect to the first pillar, and extending along the vehicle upper-lower direction; a transparent member interposed between the first pillar and the second pillar; a front pillar garnish covering the first pillar and the second pillar and having a lower end portion protruding along at least one of a vehicle front-rear direction and a vehicle width direction; and a curtain airbag device configured to include a curtain airbag, configured to be inflation-deployed in a curtain shape in a vehicle cabin side portion, and having a front end portion fixed at a position in the first pillar or the second pillar corresponding to the lower end portion of the front pillar garnish.

5 Claims, 5 Drawing Sheets

(56) References Cited

U.S. PATENT DOCUMENTS

| | | | |
|---|---|---|---|
| 7,934,746 B2* | 5/2011 | Glaser | B60R 13/025 |
| | | | 280/728.3 |
| 8,480,120 B1 | 7/2013 | Fukuda et al. | |
| 9,387,821 B1* | 7/2016 | Saunders | B60R 21/215 |
| 2007/0108742 A1 | 5/2007 | Itakura | |
| 2008/0238049 A1* | 10/2008 | Putcha | B60R 21/215 |
| | | | 280/728.3 |
| 2008/0238053 A1* | 10/2008 | Downey | B60R 21/232 |
| | | | 280/730.2 |
| 2018/0273104 A1 | 9/2018 | Ikeda et al. | |
| 2019/0233018 A1* | 8/2019 | Tanaka | B60R 21/213 |

FOREIGN PATENT DOCUMENTS

| | | |
|---|---|---|
| JP | H11-263184 A | 9/1999 |
| JP | 2006-273057 A | 10/2006 |
| JP | 2007-196729 A | 8/2007 |
| JP | 2010-006100 A | 1/2010 |
| JP | 2012-040963 A | 3/2012 |
| JP | 2012-091674 A | 5/2012 |
| JP | 2014-065330 A | 4/2014 |
| JP | 2015-202783 A | 11/2015 |
| JP | 2018-162027 A | 10/2018 |

\* cited by examiner

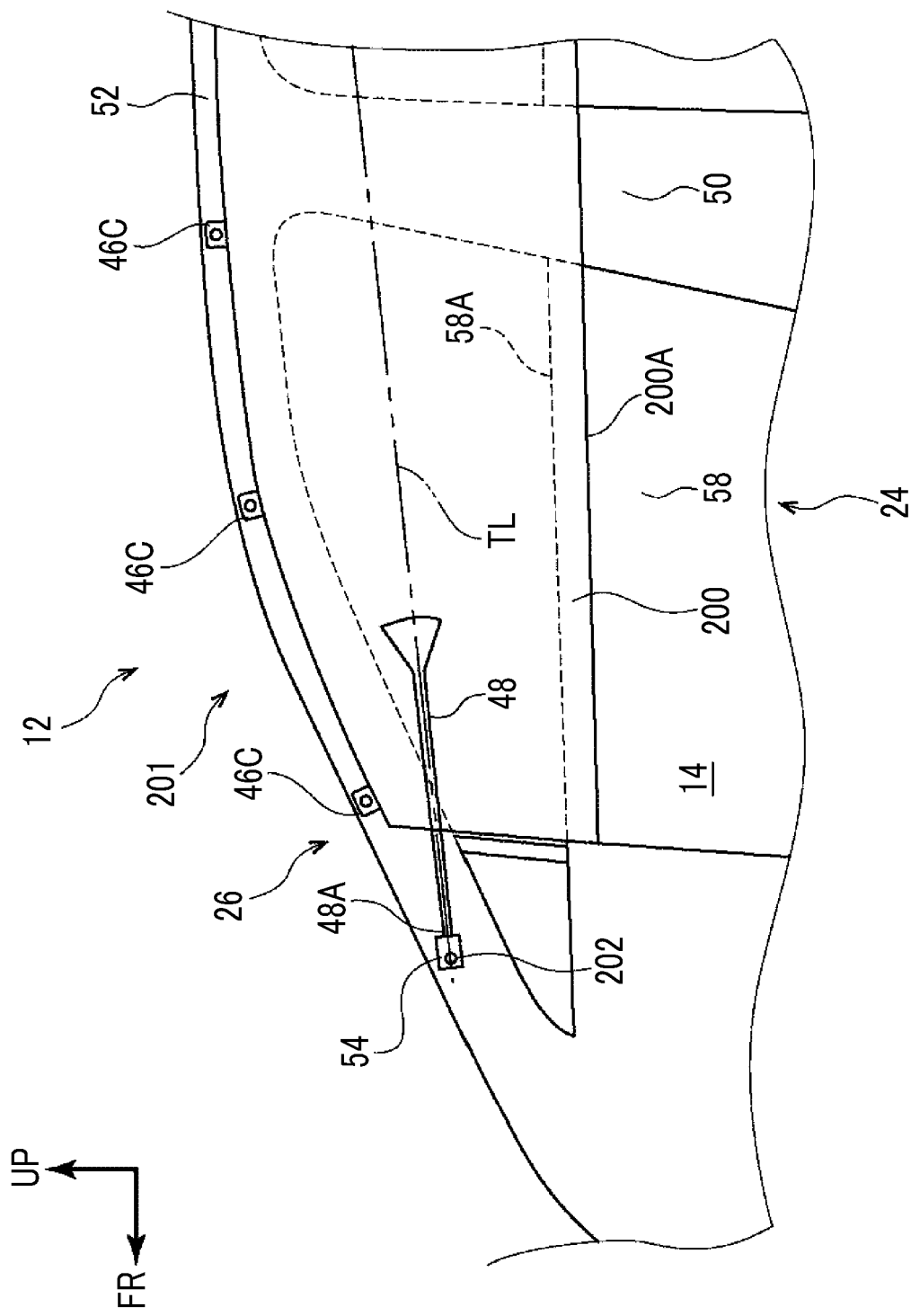

MOUNTING STRUCTURE FOR CURTAIN AIRBAG DEVICE

INCORPORATION BY REFERENCE

The disclosure of Japanese Patent Application No. 2017-238074 filed on Dec. 12, 2017 including the specification, drawings and abstract is incorporated herein by reference in its entirety.

BACKGROUND

1. Technical Field

The disclosure relates to a mounting structure for a curtain airbag device.

2. Description of Related Art

Japanese Unexamined Patent Application Publication No. 2006-273057 (JP 2006-273057 A) discloses a vehicular pillar structure. The vehicular pillar structure has a front pillar inner panel, a front pillar frame disposed to face the front pillar inner panel, and a front pillar garnish disposed on the vehicle cabin inner side of the front pillar inner panel and a transparent member is held by the front pillar inner panel and the front pillar frame. An opening is formed to penetrate the front pillar inner panel, the front pillar frame, and the front pillar garnish in a plate thickness direction. A driver can visually recognize an object beyond a front pillar from the opening via the transparent member.

SUMMARY

In general, a curtain airbag inflation-deployed in a curtain shape in a vehicle cabin side portion during a vehicle collision has a part accommodated in a space formed by a front pillar inner panel and a front pillar garnish prior to the inflation deployment. However, the vehicular pillar structure disclosed in JP 2006-273057 A is configured to have the front pillar that has an opening and configured to be divided into a first pillar disposed on the vehicle front side in the front-rear direction of a vehicle and a second pillar disposed on the rear side of the vehicle across the opening. Accordingly, the space that is formed by the front pillar inner panel and the front pillar garnish is small. Considering the field of view during vehicle driving, each of the first and second pillars may be reduced in thickness for a reduced area of the section that is orthogonal to a longitudinal direction. Then, it may be impossible in terms of layout to ensure a space for curtain airbag attachment to the body of the vehicle.

The disclosure provides a mounting structure for a curtain airbag device with which both a wide field of view during vehicle driving and a curtain airbag attachment space can be ensured.

An aspect of the disclosure relates to a mounting structure for a curtain airbag device. The mounting structure includes: a first pillar constituting a part of a front pillar and extending along a vehicle upper-lower direction; a second pillar constituting another part of the front pillar, disposed on a vehicle rear side at a predetermined interval with respect to the first pillar, and extending along the vehicle upper-lower direction; a transparent member interposed between the first pillar and the second pillar and allowing an outside of a vehicle to be visually recognized from a driver's seat side; a front pillar garnish covering the first pillar and the second pillar from a vehicle cabin side and having a lower end portion protruding along at least one of a vehicle front-rear direction and a vehicle width direction; and a curtain airbag device configured to include a curtain airbag and being stored along the first pillar or the second pillar, the curtain airbag being configured to be able to be inflation-deployed in a curtain shape in a vehicle cabin side portion by receiving gas supply during a vehicle collision, and having a front end portion fixed at a position in the first pillar or the second pillar corresponding to the lower end portion of the front pillar garnish (in this specification, the "vehicle upper-lower direction" also means a "substantially upper-lower direction of the vehicle").

According to the aspect, the mounting structure includes the first pillar constituting a part of the front pillar and extending along the vehicle upper-lower direction; and the second pillar constituting another part of the front pillar, disposed on the vehicle rear side at a predetermined interval with respect to the first pillar, and extending along the vehicle upper-lower direction. Accordingly, a driver can visually recognize an object beyond the front pillar from the transparent member interposed between the first pillar and the second pillar.

The curtain airbag device configured to include the curtain airbag configured to be able to be inflation-deployed in a curtain shape in the vehicle cabin side portion by receiving gas supply during a vehicle collision is stored along the first pillar or the second pillar, and the front end portion of the curtain airbag is fixed at a position in the first pillar or the second pillar corresponding to the lower end portion of the front pillar garnish. The lower end portion of the front pillar garnish protrudes along at least one of the vehicle front-rear direction and the vehicle width direction, and thus the front end portion of the curtain airbag can be fixed at the part where a space formed by the front pillar and the front pillar garnish is wide. A space for attachment of the front end portion to a vehicle body can be ensured in the curtain airbag, and thus it is possible to reduce the area of the section of the front pillar that is orthogonal to a longitudinal direction at a non-lower end portion part of the front pillar garnish. In other words, the field of view during driving can be widened with a space ensured for attachment of the curtain airbag to the vehicle body.

The "vehicle cabin side portion" may also mean a vehicle width direction inside part and the vicinity of side door glass and the like and an interior member such as a rear door trim, a front door trim (hereinafter, simply referred to as a "door trim"), and a pillar garnish disposed on the vehicle width direction outer side of the vehicle cabin.

In the mounting structure according to the aspect, the curtain airbag device may be stored along the second pillar, and the front end portion of the curtain airbag may be fixed at a position in the second pillar corresponding to the lower end portion of the front pillar garnish.

According to the aspect, the curtain airbag device is stored along the second pillar and the front end portion of the curtain airbag is fixed at a position in the second pillar that corresponds to the lower end portion of the front pillar garnish. In a case where the curtain airbag is stored along the first pillar according to the related art, for example, the curtain airbag is inflation-deployed in a curtain shape in the vehicle cabin side portion, and thus the second pillar disposed on the vehicle rear side of the first pillar may suppress smooth inflation deployment of the curtain airbag. According to the above-described aspect, however, the curtain airbag is stored along the second pillar, and thus the curtain airbag can be smoothly inflation-deployed without being affected by the second pillar.

In the mounting structure according to the aspect, the front pillar garnish may include: a front side garnish attached to the first pillar; and a rear side garnish configured as a body separate from the front side garnish, attached to the second pillar, covering the curtain airbag from a vehicle cabin inner side, and configured to be able to hold the curtain airbag in a state where the curtain airbag is apart from the second pillar.

According to the aspect, the front pillar garnish is attached to the vehicle cabin inner side of the front pillar. The front pillar garnish is configured to include the front side garnish attached to the first pillar and the rear side garnish attached to the second pillar and configured as a body separate from the front side garnish. The rear side garnish is configured to cover the curtain airbag from the vehicle cabin inner side and be able to hold the curtain airbag apart from the second pillar. Accordingly, during inflation deployment of the curtain airbag, the deployment load of the curtain airbag is transmitted solely to the rear side garnish and the deployment load causes the rear side garnish to be held apart from the second pillar. Accordingly, the curtain airbag can be smoothly inflation-deployed into the vehicle cabin from the space between the second pillar and the rear side garnish with damage attributable to local deployment load application to the front pillar garnish and scattering of the front pillar garnish into the vehicle cabin suppressed.

In the mounting structure according to the aspect, the rear side garnish may be attached to the second pillar via a tether clip.

According to the above-described aspect, the rear side garnish is attached to the second pillar via the tether clip, and thus it is possible to suppress scattering of the rear side garnish by the tether clip during separation of the rear side garnish from the second pillar resulting from inflation deployment of the curtain airbag.

In the mounting structure according to the aspect, the curtain airbag may be formed such that a lower end portion at a time of inflation deployment is positioned at the same height in the upper-lower vehicle direction as or is positioned above an upper edge portion of a front door trim covering a front side door from the vehicle cabin side (in this specification, "the same" also means "substantially the same").

According to the aspect, the lower end portion of the curtain airbag at a time of inflation deployment is formed to be positioned above the upper edge portion of the door trim. In general, a curtain airbag able to cope with rollover has a lower end portion at a time of inflation deployment positioned below the upper edge portion of the door trim so that a reaction force is taken during inflation deployment. As a result, a reaction force is taken from the door trim. According to the aspect of the disclosure, in contrast, the front end portion of the curtain airbag is fixed at a position corresponding to the lower end portion of the front pillar garnish, and thus a virtual tension line (vehicle front side close to the front end portion in particular) connecting the front end portion and the rear end portion of the curtain airbag is disposed at a position relatively close to the upper edge portion of the door trim. Although tension is applied by the tension line connecting the front end portion and the rear end portion of the curtain airbag fixed to the vehicle body, the part between the tension line and the upper edge portion of the curtain airbag at a time of inflation deployment is likely to be affected by the tension of the tension line. Accordingly, displacement with respect to the vehicle body can be suppressed and an occupant can be effectively restrained. In other words, the curtain airbag does not have to take any reaction force from the door trim. Accordingly, the lower end portion of the curtain airbag can be positioned above the upper edge portion of the door trim, and thus the vehicle upper-lower direction dimension of the curtain airbag can be reduced and the yield of the base cloth that constitutes the curtain airbag can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a schematic side view illustrating a state where a curtain airbag is inflation-deployed in a vehicle that has a mounting structure for a curtain airbag device according to the related art.

DETAILED DESCRIPTION OF EMBODIMENTS

Figure 1:
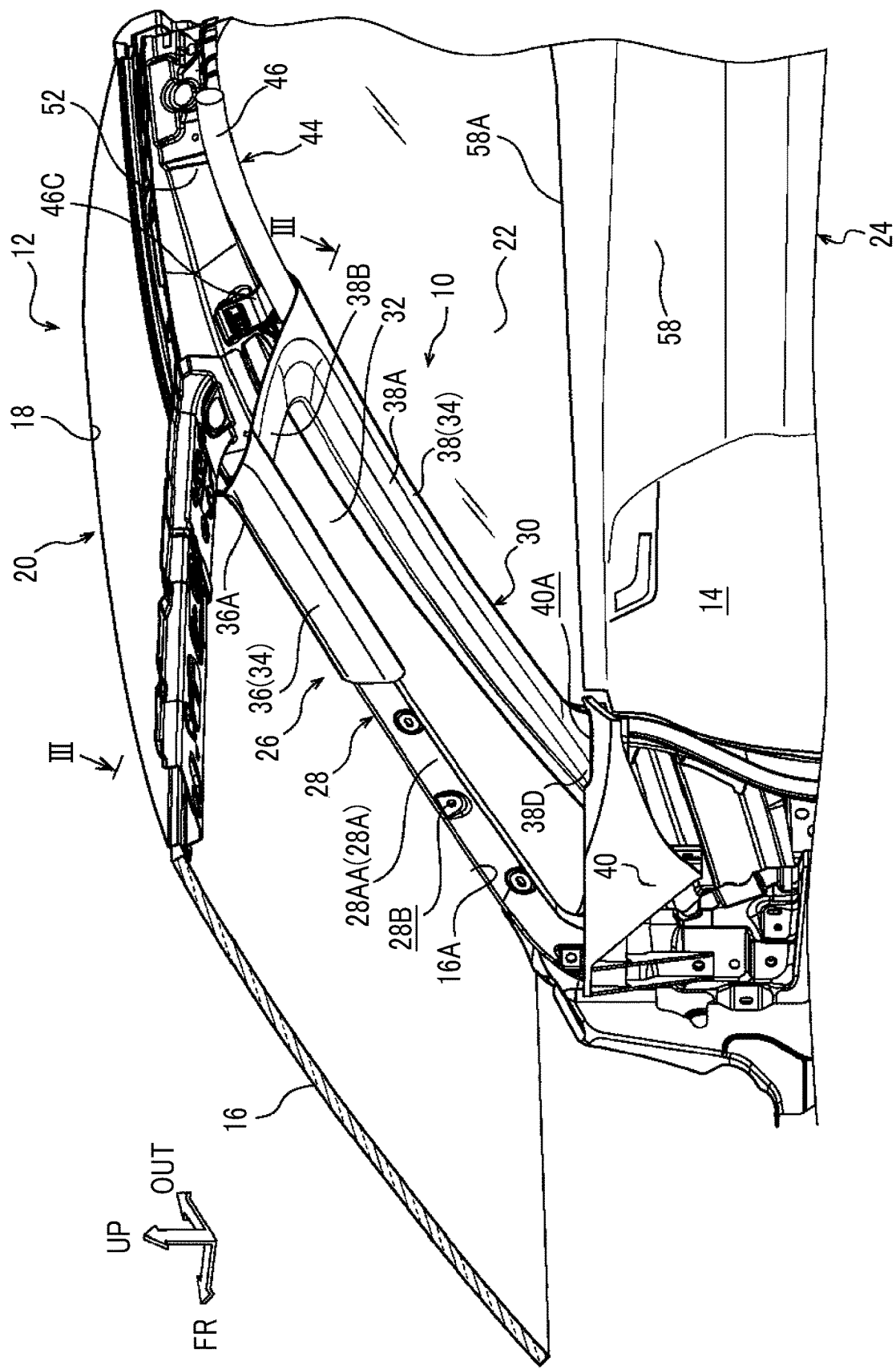
FIG. 1 is a schematic perspective and partial sectional view illustrating the inside of the cabin of a vehicle that has a mounting structure for a curtain airbag device according to an embodiment.

Hereinafter, an embodiment of a mounting structure for a curtain airbag device will be described with reference to FIGS. 1 to 4. The arrows FR, OUT, and UP in the drawings represent the front side in the front-rear direction of a vehicle, an outer side in the width direction of the vehicle, and the upper side in the upper-lower direction of the vehicle, respectively.

As illustrated in FIG. 1, front windshield glass (hereinafter, simply referred to as a "windshield") 16 is disposed on the vehicle front side in a vehicle cabin 14 of a vehicle 12 to which a mounting structure 10 for a curtain airbag device according to the present embodiment is applied. The windshield 16 is a transparent window member and the plate thickness direction of the windshield 16 corresponds to the vehicle front-rear direction. The windshield 16 separates the inside of the vehicle cabin 14 and the outside of the vehicle cabin 14 from each other. The windshield 16 is inclined to the rear upper side of the vehicle in a side view (in this specification, the "vehicle front-rear direction" also means a "substantially front-rear direction of the vehicle"). The upper end portion of the windshield 16 is connected to the front end portion of a roof 20 configured to include a roof panel 18. The lower end portion of the windshield 16 is disposed to face, in the vehicle front-rear direction, the rear end portion of a hood (not illustrated) covering a power unit room (not illustrated) on the vehicle front side from the vehicle upper side. The lower end portion of the windshield 16 is connected to a cowl (not illustrated) extending in the vehicle width direction.

The windshield 16 is formed to have a constant plate thickness. The intermediate part of the windshield 16 in the vehicle width direction is gently curved and convex to the vehicle front side. A pair of right and left front pillars 26 is disposed on the vehicle width direction outer sides of the windshield 16 and the vehicle front sides of front side doors (hereinafter, simply referred to as "front doors") 24 that have front side windows 22, respectively.

Each of the right and left front pillars 26 extends along a vehicle width direction end portion 16A of the windshield 16 with the longitudinal direction thereof corresponding to the vehicle upper-lower direction. In other words, each of the right and left front pillars 26 is inclined to the rear upper side of the vehicle. The front pillar 26 on the driver's seat side will be described below. The front pillar 26 on the side opposite to the driver's seat side (on the passenger seat side) has the same configuration as the front pillar 26 on the driver's seat side.

The front pillar 26 has a first pillar 28 and a second pillar 30. The first pillar 28 extends along the vehicle upper-lower direction. The vehicle width direction end portion 16A of the windshield 16 is joined to the first pillar 28 via a urethane adhesive (not illustrated) and cushion rubber (not illustrated). The first pillar 28 is configured to include a steel plate-based first pillar inner panel 28A as a pillar inner panel and a steel plate-based first pillar outer panel (not illustrated) as a pillar outer panel. End portions of the first pillar inner panel 28A orthogonal to the longitudinal direction are respectively joined to end portions of the first pillar outer panel orthogonal to the longitudinal direction. As a result, a configuration is achieved in which a section orthogonal to the longitudinal direction is a closed section.

The second pillar 30 is disposed on the vehicle rear side of the first pillar 28 (in this specification, the "vehicle rear side" also means a "substantially rear side of the vehicle"). Specifically, the second pillar 30 is disposed at a predetermined interval in the vehicle front-rear direction with respect to the first pillar 28. The predetermined interval is set to at least the inter-pupil center distance of a driver sitting on a vehicle seat (not illustrated). The "inter-pupil center distance" means the distance between the pupil center of the driver's right eye (not illustrated) and the pupil center of the driver's left eye (not illustrated) and is, for example, approximately 60 mm to 65 mm in the case of normal Japanese adults. In the present embodiment, the predetermined interval is set to 65 mm as an example.

Figure 2:
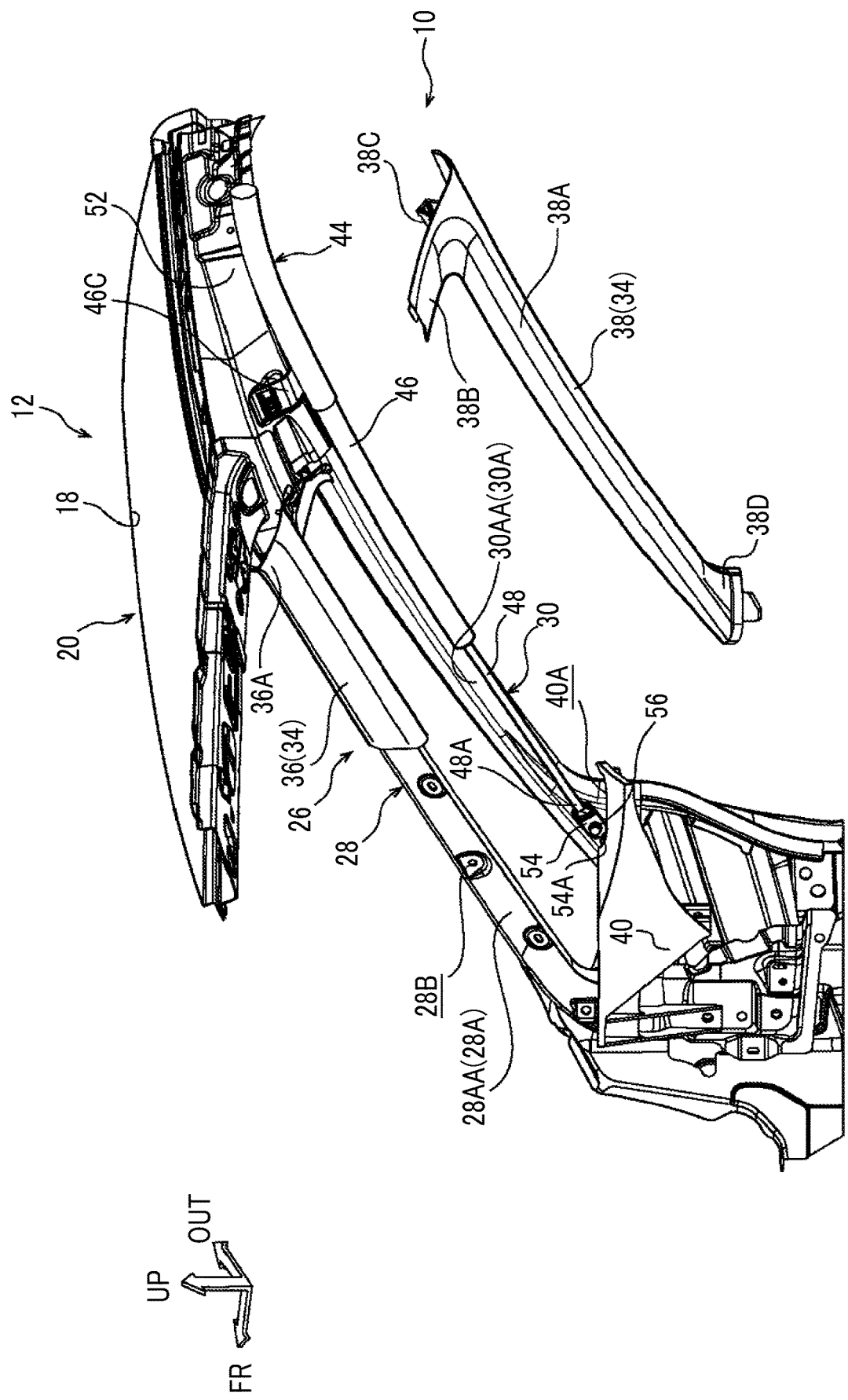
FIG. 2 is a schematic perspective view illustrating a state where a rear side garnish is removed with respect to FIG. 1.

The second pillar 30 extends in parallel to the first pillar 28 (along the vehicle upper-lower direction) (in this specification, "parallel" also means "substantially parallel"). As illustrated in FIG. 2, the second pillar 30 is configured to include a steel plate-based second pillar inner panel 30A as a pillar inner panel and a steel plate-based second pillar outer panel (not illustrated) as a pillar outer panel. End portions of the second pillar inner panel 30A orthogonal to the longitudinal direction are respectively joined to end portions of the second pillar outer panel orthogonal to the longitudinal direction. As a result, a configuration is achieved in which a section orthogonal to the longitudinal direction is a closed section.

Front pillar outer glass 32 (refer to FIG. 1) as a transparent member is interposed between the first pillar 28 and the second pillar 30 from the vehicle width direction outer side via a urethane adhesive (not illustrated) and cushion rubber (not illustrated) (in this specification, the "vehicle width direction" also means a "substantially width direction of the vehicle"). The front pillar outer glass 32 is a transparent window member and the plate thickness direction of the front pillar outer glass 32 corresponds to the vehicle width direction. The front pillar outer glass 32 is inclined to the rear upper side of the vehicle in a side view. The front pillar outer glass 32 is not limited to glass. Alternatively, a transparent fiber reinforced resin and so on may constitute the front pillar outer glass 32.

As illustrated in FIG. 1, a front pillar garnish 34 is disposed on the vehicle width direction inner sides of the first pillar 28 and the second pillar 30. The front pillar garnish 34 is resinous. The front pillar garnish 34 is configured to include a front side garnish 36 disposed on the side of the first pillar 28 that is in the vehicle cabin and a rear side garnish 38 disposed on the side of the second pillar 30 that is in the vehicle cabin. The rear side garnish 38 is configured as a body separate from the front side garnish 36.

The front side garnish 36 extends in the vehicle upper-lower direction along the first pillar 28 (in FIGS. 1 and 2, the first pillar 28 is illustrated without the vehicle lower side part of the front side garnish 36 being illustrated). A plurality of clip seats (not illustrated) and clips (not illustrated) attached to the clip seats are disposed along the longitudinal direction of the front side garnish 36 and apart from one another on the vehicle width direction outside surface (back surface) of the front side garnish 36. The clip seat is disposed to face a wall portion 28AA, which is on the vehicle width direction inner side of the first pillar inner panel 28A. The front side garnish 36 is attached to the first pillar 28 by the clips attached to the respective clip seats being inserted into a plurality of through-holes 28B (merely one of the through-holes 28B being illustrated in FIGS. 1 and 2). The through-hole 28B is formed to penetrate the wall portion 28AA in the plate thickness direction. The lower end portion (not illustrated) of the front side garnish 36 on the vehicle lower side is plugged in a socket (not illustrated), which is formed on the vehicle width direction outer side of an instrumental panel 40. An upper end portion 36A of the front side garnish 36 on the vehicle upper side abuts against a roof head liner (not illustrated).

The shape of the section of the front side garnish 36 that is orthogonal to the longitudinal direction is formed in a U-shape open toward the vehicle width direction outer side (in this specification, the "U-shape" also means a "substantially U-shape"). An accommodating space (not illustrated) is formed between the front side garnish 36 and the first pillar inner panel 28A. A wire harness (not illustrated) and a hose (not illustrated) are an example of what is arranged in the accommodating space.

Figure 3:
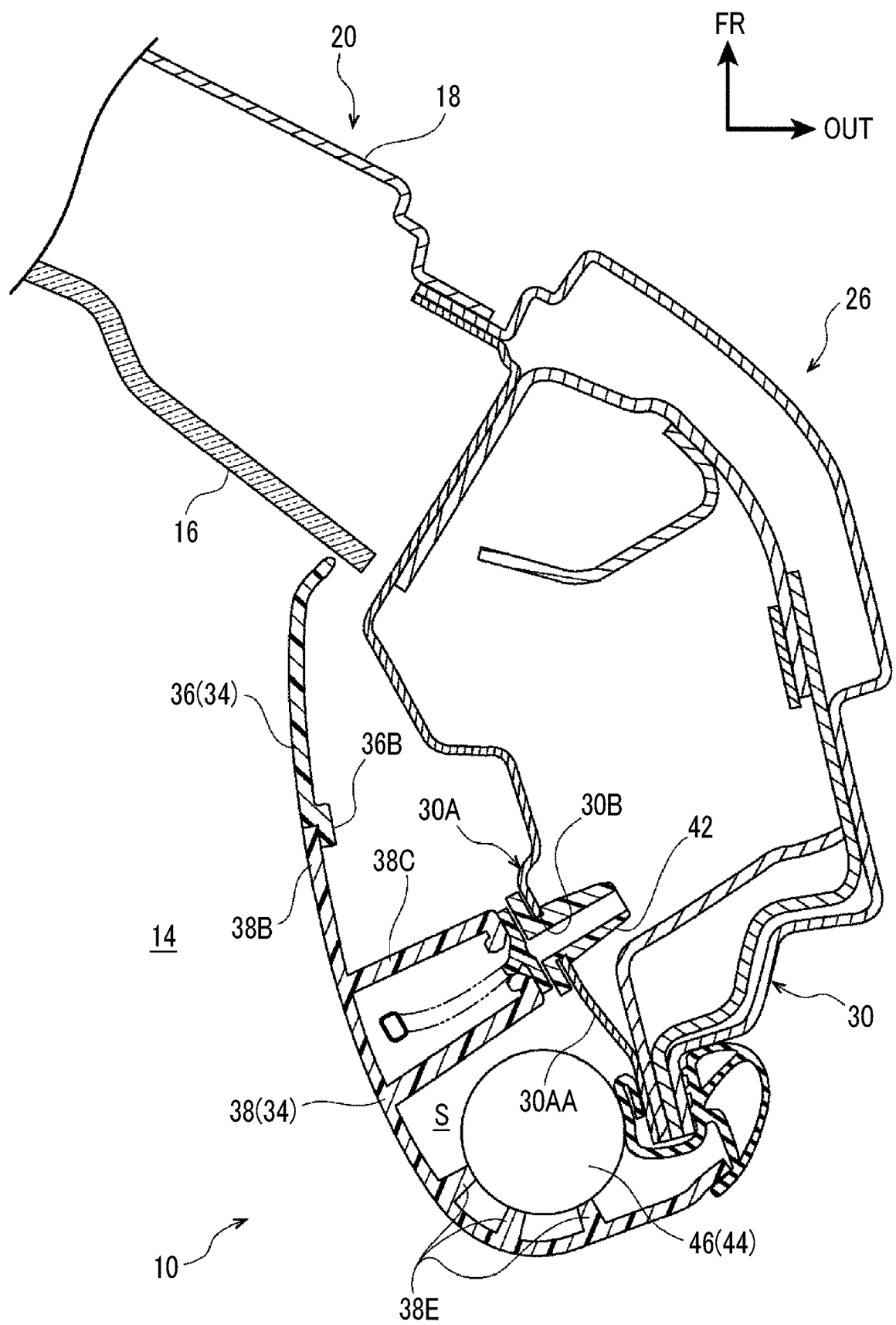
FIG. 3 is an enlarged sectional view illustrating a state of cutting along line of FIG. 1.

The rear side garnish 38 has a body portion 38A extending in the vehicle upper-lower direction along the second pillar 30 and an extending portion 38B disposed on the vehicle upper side of the body portion 38A. The shape of the section of the body portion 38A that is orthogonal to the longitudinal direction is formed in a U-shape open toward the vehicle width direction outer side (not illustrated). As illustrated in FIG. 3, a clip seat 38C and a tether clip 42 attached to the clip seat 38C are disposed on the vehicle width direction outside surface (back surface) of the rear side garnish 38. The basic configuration of the tether clip is almost the same as known configurations, examples of which include that in Japanese Unexamined Patent Application Publication No. 2015-202783 (JP 2015-202783 A). Accordingly, detailed description of the basic configuration of the tether clip will be omitted here.

The longitudinal direction intermediate portion of the body portion 38A is provided with a clip seat (not illustrated) that is the same in configuration as the front side garnish 36 and a clip (not illustrated) attached to the clip seat (in this specification, the "intermediate portion" also means a "substantially intermediate portion").

The tether clip 42 attached to the clip seat 38C disposed on the rear side garnish 38 is inserted in a through-hole 30B, which is formed to penetrate a flat wall 30AA of the second pillar inner panel 30A in the plate thickness direction. Likewise, the clip attached to the clip seat of the rear side garnish 38 other than the clip seat 38C is inserted in another through-hole (not illustrated) formed to penetrate the flat wall 30AA of the second pillar inner panel 30A in the plate thickness direction. The rear side garnish 38 is attached to the second pillar 30 as a result of the above-described configuration. As illustrated in FIG. 1, a lower end portion 38D of the rear side garnish 38 on the vehicle lower side is plugged in a socket 40A formed in the instrumental panel 40. The lower end portion 38D of the rear side garnish 38 gently protrudes along the vehicle front-rear direction (to the vehicle rear side to be specific) from the vehicle upper side toward the vehicle lower side. In other words, the vehicle front-rear direction dimension of the lower end portion 38D of the rear side garnish 38 exceeds the vehicle front-rear direction dimension of the non-lower end portion 38D part of the rear side garnish 38.

The extending portion 38B of the rear side garnish 38 is formed integrally with the rear side garnish 38. The vehicle upper side end portion of the extending portion 38B abuts against the roof head liner. The vehicle front side end portion of the extending portion 38B is assembled to overlap an assembly portion 36B, which is formed in the upper end portion 36A of the front side garnish 36, from the vehicle cabin side (refer to FIG. 3).

As illustrated in FIG. 2, a curtain airbag device 44 is provided with a curtain airbag 46, a tether strap 48, and an inflator (not illustrated). The curtain airbag 46 is formed to be inflation-deployed along a vehicle cabin side portion by gas being supplied from the inflator (refer to FIG. 4) and partially cover the front side window 22 and a center pillar 50 (refer to FIG. 4).

Figure 4:
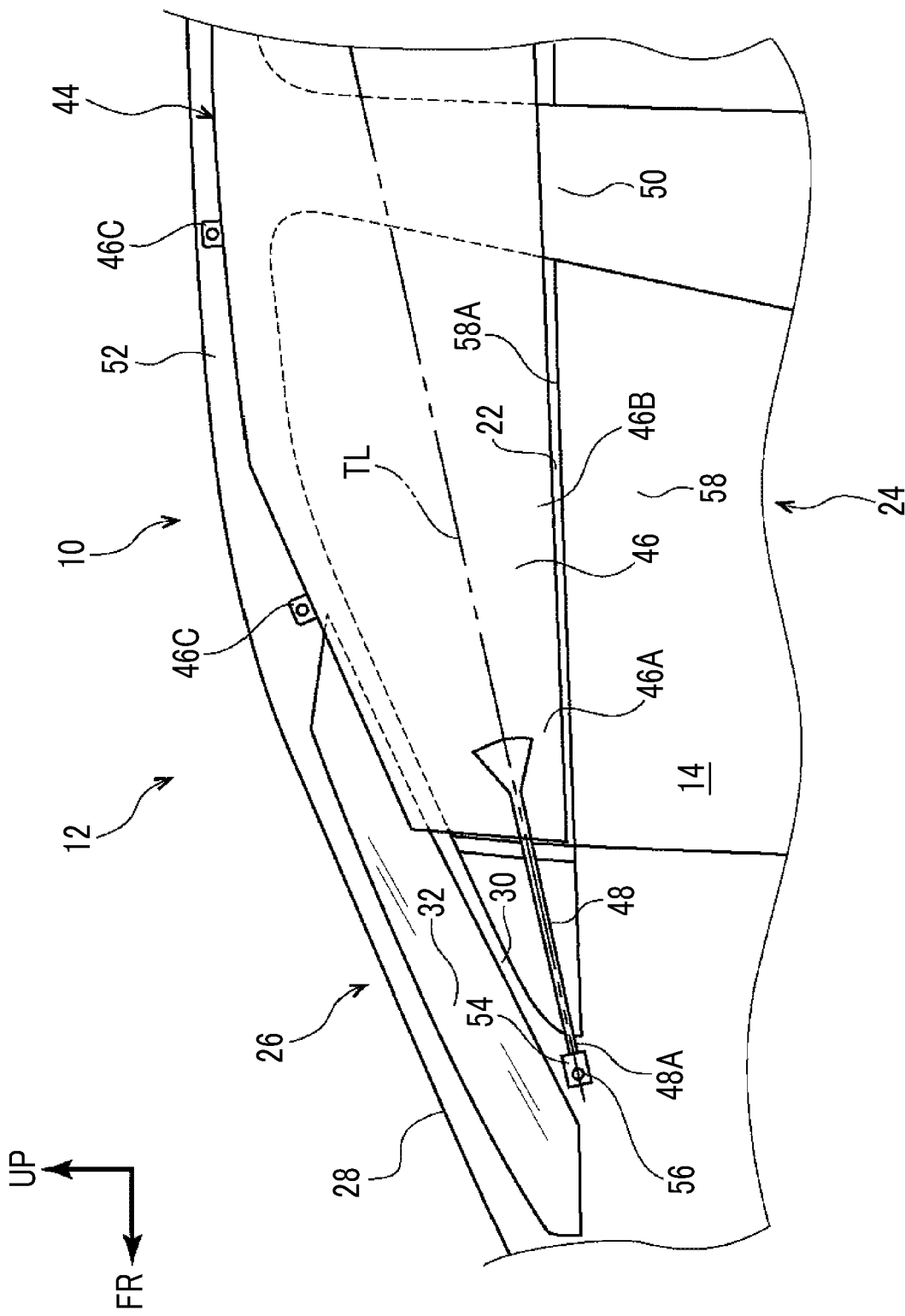
FIG. 4 is a schematic side view illustrating a state where a curtain airbag is inflation-deployed in the vehicle that has the mounting structure for a curtain airbag device according to the embodiment.

The curtain airbag 46 is, for example, formed in a bag shape by sewing of a base cloth 46A (refer to FIG. 4). Normally, the curtain airbag 46 remains folded in an elongated shape and stored with the inflator in a roof side rail 52 disposed in the upper end portion of the vehicle cabin side portion. The curtain airbag 46 is configured such that the elongated curtain airbag 46 in the above-described storage state extends along the roof side rail 52 from the substantially intermediate portion of the second pillar 30 of the front pillar 26 in the longitudinal direction to the upper end side of a rear pillar (not illustrated). The basic configuration of the curtain airbag 46 is almost the same as known configurations, examples of which include that in Japanese Unexamined Patent Application Publication No. 2012-040963 (JP 2012-040963 A). Accordingly, detailed description of the basic configuration of the curtain airbag 46 will be omitted here.

As illustrated in FIG. 3, the curtain airbag 46 arranged along the second pillar 30 is accommodated in an accommodating space S, which is formed by the rear side garnish 38 and the second pillar 30, in a state where the curtain airbag 46 abuts against the tip portions of ribs 38E of the rear side garnish 38.

As illustrated in FIG. 2, the tether strap 48 formed in a band shape is attached by sewing or the like to the vehicle front side of the curtain airbag 46. The tether strap 48 extends along the second pillar 30 and a bracket 54 as the front end portion of the curtain airbag 46 is attached to a vehicle front side end portion 48A. The bracket 54 is, for example, metallic, formed in a rectangular plate shape with the plate thickness direction thereof corresponding to the vehicle width direction, and provided with a through-hole (not illustrated) penetrating the bracket 54 in the plate thickness direction (here, the "rectangular plate shape" also means a "substantially rectangular plate shape"). The bracket 54 is fixed to the second pillar 30, to the front pillar 26 in turn, by fastening being performed with a fastener 56 inserted from the vehicle cabin side in the through-hole and the through-hole (not illustrated) formed in the second pillar inner panel 30A. The bracket 54 is fixed at a position in the second pillar inner panel 30A that corresponds to the lower end portion 38D of the rear side garnish 38 (refer to, for example, FIG. 1). The curtain airbag 46 is fixed to each of the front pillar 26, the roof side rail 52, and the rear pillar (not illustrated), as well as the bracket 54, by a plurality of fixing units 46C (merely some of the fixing units 46C being illustrated in the drawings).

An anti-rotation unit 54A is disposed in the tip portion of the bracket 54. The anti-rotation unit 54A protrudes to the vehicle width direction outer side along the plate thickness direction. The anti-rotation unit 54A is inserted in the through-hole (not illustrated) that is formed in the second pillar inner panel 30A. As a result, rotation of the bracket 54 is suppressed during fastening of the fastener 56.

The tether strap 48 is for (the posture of) the curtain airbag 46 to be held by tension with respect to the body of the vehicle when the curtain airbag 46 restrains an occupant. In other words, as illustrated in FIG. 4, the curtain airbag 46 is a configuration held in the vehicle body during occupant restraint (in an inflation deployment state) by the tension that acts along a tension line TL, which connects the bracket 54 and the fixing unit in the rear pillar (not illustrated) to each other.

The curtain airbag 46 is formed such that the curtain airbag 46 covers the front side window 22 during inflation deployment and the lower end portion 38D is positioned above an upper edge portion 58A of a door trim 58, which is an interior member covering the front door 24 from the vehicle cabin side (in this specification, to "cover" also means to "substantially cover").

Action and Effect

The action and effect of the present embodiment will be described below.

Once a lateral collision of the vehicle is detected by an airbag sensor (not illustrated) and a collision signal is output to a controller (not illustrated), the controller allows a predetermined current to flow to the inflator in a case where the controller determines based on the input collision signal that the current flow is needed. As a result, the inflator is operated and gas flows into the folded curtain airbag 46. This results in initial inflation of the curtain airbag 46, and then the curtain airbag 46 takes a reaction force from the flat wall 30AA illustrated in FIG. 3 and transmits a deployment load to the rear side garnish 38. Accordingly, the rear side garnish 38 is separated from the second pillar 30 within a range allowed by the tether clip 42 and is held in the separated state. In the above-described state, the curtain airbag 46 is inflation-deployed in a curtain shape toward the vehicle lower side from the gap between the rear side garnish 38 and the second pillar 30 as illustrated in FIG. 3. An occupant can be restrained as a result.

As illustrated in FIG. 1, the present embodiment is provided with the first pillar 28 constituting a part of the front pillar 26 and extending along the vehicle upper-lower direction and the second pillar 30 constituting another part of the front pillar 26, disposed on the vehicle rear side at a predetermined interval with respect to the first pillar 28, and extending along the vehicle upper-lower direction. Accordingly, a driver can visually recognize an object beyond the front pillar 26 from the front pillar outer glass 32 interposed between the first pillar 28 and the second pillar 30.

As illustrated in FIG. 2, the curtain airbag device 44 configured to include the curtain airbag 46 configured to be able to be inflation-deployed in a curtain shape in the vehicle cabin side portion by receiving gas supply during a vehicle collision is stored along the second pillar 30 and the bracket 54 of the tether strap 48 of the curtain airbag 46 is fixed at a position corresponding to the lower end portion 38D of the rear side garnish 38 of the second pillar 30. The lower end portion 38D of the rear side garnish 38 protrudes to the vehicle rear side along the vehicle front-rear direction, and thus the bracket 54 of the curtain airbag 46 can be fixed at the part where the accommodating space S (refer to FIG. 3) formed by the front pillar 26 (second pillar 30) and the front pillar garnish 34 (rear side garnish 38) is wide. A space for attachment of the bracket 54 to the vehicle body can be ensured in the curtain airbag 46, and thus it is possible to reduce the area of the section of the rear side garnish 38 that is orthogonal to the longitudinal direction at the non-lower end portion 38D part of the rear side garnish 38. In other words, the field of view during driving can be widened with a space ensured for attachment of the curtain airbag 46 to the vehicle body. Accordingly, a wide field of view during vehicle driving and an attachment space for the curtain airbag 46 can be ensured.

The curtain airbag device 44 is stored along the second pillar 30 and the bracket 54 of the curtain airbag 46 is fixed at a position in the second pillar 30 that corresponds to the lower end portion 38D of the front pillar garnish 34. In a case where the curtain airbag 46 is stored along the first pillar 28, for example, the curtain airbag 46 is inflation-deployed in a curtain shape in the vehicle cabin side portion, and thus the second pillar 30 behind the first pillar 28 may suppress smooth inflation deployment of the curtain airbag 46. In the configuration of the disclosure, however, the curtain airbag 46 is stored along the second pillar 30, and thus the curtain airbag 46 can be smoothly inflation-deployed without being affected by the second pillar 30. As a result, the deployment performance of the curtain airbag 46 can be improved.

The front pillar garnish 34 is attached to the vehicle cabin inner side of the front pillar 26. The front pillar garnish 34 is configured to include the front side garnish 36 attached to the first pillar 28 and the rear side garnish 38 attached to the second pillar 30 and configured as a body separate from the front side garnish 36. The rear side garnish 38 is configured to cover the curtain airbag 46 from the vehicle cabin inner side and be able to hold the curtain airbag 46 apart from the second pillar 30. Accordingly, during inflation deployment of the curtain airbag 46, the deployment load of the curtain airbag 46 is transmitted solely to the rear side garnish 38 and the deployment load causes the rear side garnish 38 to be held apart from the second pillar 30. Accordingly, the curtain airbag 46 can be smoothly inflation-deployed into the vehicle cabin from the space between the second pillar 30 and the rear side garnish 38 with damage attributable to local deployment load application to the front pillar garnish 34 and scattering of the front pillar garnish 34 into the vehicle cabin suppressed.

As illustrated in FIG. 3, the rear side garnish 38 is attached to the second pillar 30 via the tether clip 42, and thus it is possible to suppress scattering of the rear side garnish 38 by the tether clip 42 during separation of the rear side garnish 38 from the second pillar 30 resulting from inflation deployment of the curtain airbag 46. As a result, it is possible to suppress scattering of the rear side garnish 38, the front pillar garnish 34 in turn, during deployment of the curtain airbag 46.

As illustrated in FIG. 4, a lower end portion 46B of the curtain airbag 46 at a time of inflation deployment is formed to be positioned above the upper edge portion 58A of the door trim 58. As illustrated in FIG. 5, in a curtain airbag mounting structure 201 according to the related art, the tension line TL at a time of inflation deployment of a curtain airbag 200 is disposed above the upper edge portion 58A of the door trim 58 in a case where a bracket 202 as the front end portion of the curtain airbag 200 is fixed in the longitudinal direction middle of the front pillar 26 (position corresponding to the non-lower end portion 38D part of the front pillar garnish 34) (here, the "middle" also means a "substantially middle"). Although tension is applied by the tension line TL connecting the rear end portion and the bracket 54 of the curtain airbag 200 fixed to the vehicle body, the upper edge portion 58A of the door trim 58 and the tension line TL are parallel to each other and are relatively apart from each other in the vehicle upper-lower direction in a vehicle side view. Accordingly, the tension of the tension line TL is unlikely to affect the part between the upper edge portion 58A and the tension line TL of the inflation-deployed curtain airbag 200. Accordingly, the part between the upper edge portion 58A and the tension line TL of the inflation-deployed curtain airbag 200 may be displaced with respect to the vehicle body and effective occupant restraint may be impossible when a load is input from the vehicle width direction inner side toward the vehicle width direction outer side during occupant restraint. In order to cope with the possibility that effective occupant restraint may be impossible and suppress displacement with respect to the vehicle body during inflation deployment, the curtain airbag 200 according to the related art has a lower end portion 200A at a time of inflation deployment that is positioned below the upper edge portion 58A of the door trim 58. As a result, a reaction force is taken from the door trim 58.

In the present embodiment, in contrast, the bracket 54 of the curtain airbag 46 is fixed at a position corresponding to the lower end portion 38D of the rear side garnish 38 as illustrated in FIG. 4, and thus the virtual tension line TL (vehicle front side close to the bracket 54 in particular) connecting the rear end portion (not illustrated) fixed to the rear pillar (not illustrated) and the bracket 54 of the curtain airbag 46 is disposed at a position relatively close to the upper edge portion 58A of the door trim 58. Accordingly, the part between the upper edge portion 58A and the tension line TL of the curtain airbag 46 at a time of inflation deployment is likely to be affected by the tension of the tension line TL, and thus displacement with respect to the vehicle body can be suppressed and an occupant can be effectively restrained. In other words, the curtain airbag 46 does not have to take any reaction force from the door trim 58. Accordingly, the lower end portion 46B of the curtain airbag 46 can be positioned above the upper edge portion 58A of the door trim 58, and thus the vehicle upper-lower direction dimension of the curtain airbag 46 can be reduced and the yield of the base cloth that constitutes the curtain airbag 46 can be improved. Manufacturing cost reduction can be achieved as a result.

Although the curtain airbag 46 is stored along the second pillar 30 in the present embodiment described above, the disclosure is not limited thereto. Alternatively, the curtain airbag 46 may be stored along the first pillar 28. In this case, the lower end portion (not illustrated) of the front side garnish 36 may protrude along the vehicle front-rear direction. Although the lower end portion 38D of the rear side garnish 38 protrudes along the vehicle front-rear direction in the present embodiment described above, the disclosure is not limited thereto. Alternatively, the front side garnish 36 also may protrude along the vehicle front-rear direction in accordance therewith.

Although the lower end portion 38D of the rear side garnish 38 protrudes along the vehicle front-rear direction in the present embodiment described above, the disclosure is not limited thereto. Alternatively, the lower end portion 38D of the rear side garnish 38 may protrude toward the vehicle width direction inner side along the vehicle width direction or protrude along each of the vehicle front-rear direction and the vehicle width direction. Likewise, the front side garnish 36 may protrude toward the vehicle width direction inner side along the vehicle width direction or protrude along each of the vehicle front-rear direction and the vehicle width direction.

Although the lower end portion 46B of the curtain airbag 46 is configured to be positioned above the upper edge portion 58A of the door trim 58 at a time of inflation deployment in the present embodiment described above, the disclosure is not limited thereto. Alternatively, the lower end portion 46B of the curtain airbag 46 may be configured to be positioned at the same height in the upper-lower vehicle direction as the upper edge portion 58A.

Although the rear side garnish 38 is attached to the second pillar 30 via the tether clip 42 in the present embodiment described above, the disclosure is not limited thereto. Alternatively, the rear side garnish 38 may be configured to be attached to the vehicle body side by a clip (such as a metallic clip) other than the tether clip 42.

Although an embodiment of the disclosure has been described above, the disclosure is not limited to the above-described embodiment, and it is a matter of course that various other modifications can be implemented within the scope of the disclosure.

What is claimed is:

1. A mounting structure for a curtain airbag device, the mounting structure comprising:
    a first pillar constituting a part of a front pillar and extending along a vehicle upper-lower direction;
    a second pillar constituting another part of the front pillar, disposed on a vehicle rear side at a predetermined interval with respect to the first pillar, and extending along the vehicle upper-lower direction;
    a transparent member interposed between the first pillar and the second pillar and allowing an outside of a vehicle to be visually recognized from a driver's seat side;
    a front pillar garnish covering the first pillar and the second pillar from a vehicle cabin side and having a lower end portion protruding along at least one of a vehicle front-rear direction and a vehicle width direction; and
    a curtain airbag device configured to include a curtain airbag and being stored along the first pillar or the second pillar, the curtain airbag being configured to be able to be inflation-deployed in a curtain shape in a vehicle cabin side portion by receiving gas supply during a vehicle collision, and having a front end portion fixed at a position in the first pillar or the second pillar corresponding to the lower end portion of the front pillar garnish.

2. The mounting structure according to claim 1, wherein:
    the curtain airbag device is stored along the second pillar; and
    the front end portion of the curtain airbag is fixed at a position in the second pillar corresponding to the lower end portion of the front pillar garnish.

3. The mounting structure according to claim 2, wherein the front pillar garnish includes:
    a front side garnish attached to the first pillar; and
    a rear side garnish configured as a body separate from the front side garnish, attached to the second pillar, covering the curtain airbag from a vehicle cabin inner side, and configured to be able to hold the curtain airbag in a state where the curtain airbag is apart from the second pillar.

4. The mounting structure according to claim 3, wherein the rear side garnish is attached to the second pillar via a tether clip.

5. The mounting structure according to claim 1, wherein the curtain airbag is formed such that the lower end portion at a time of inflation deployment is positioned at the same height in the vehicle upper-lower direction as or is positioned above an upper edge portion of a front door trim covering a front side door from the vehicle cabin side.

* * * * *